United States Patent Office 3,051,294
Patented Aug. 28, 1962

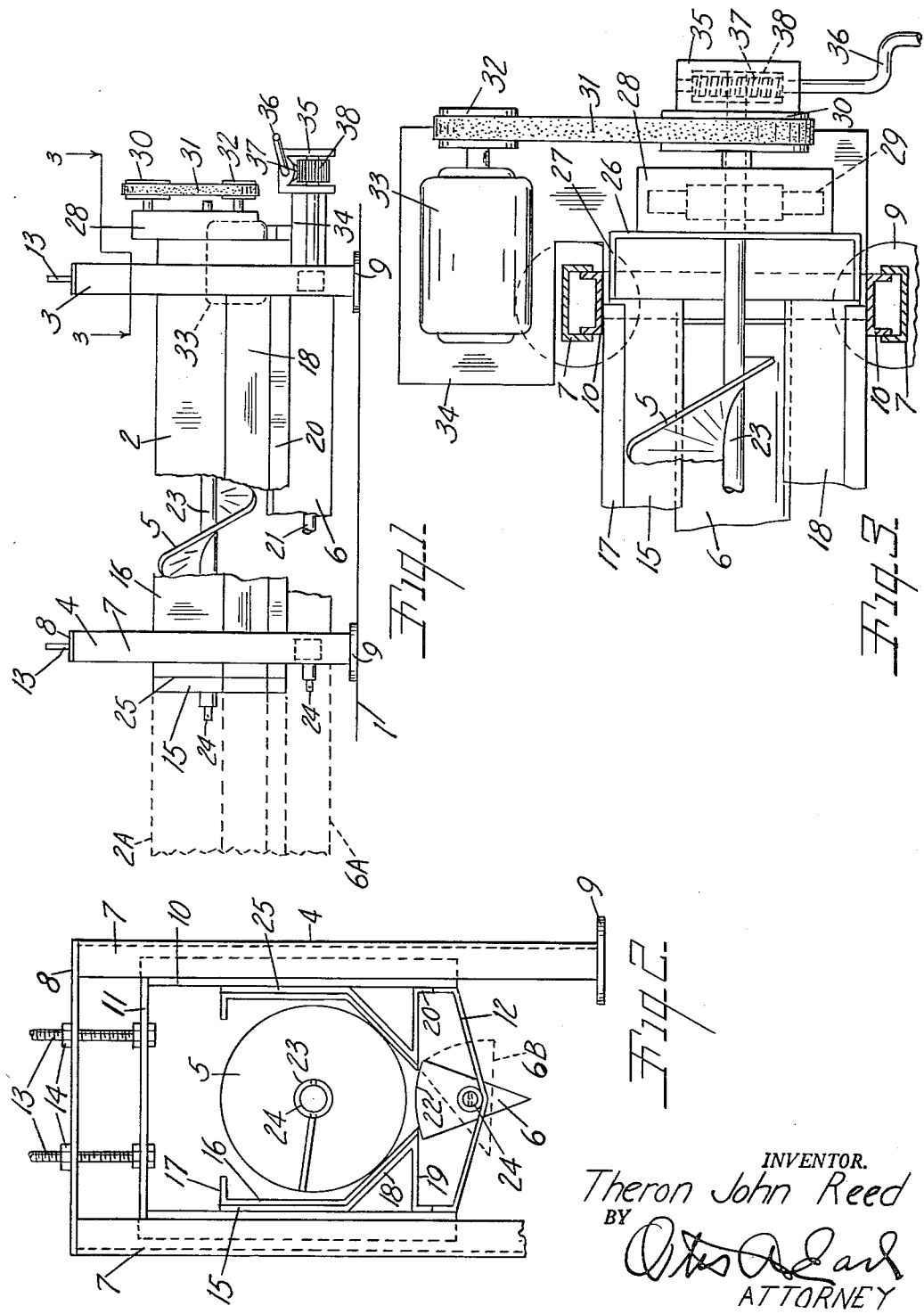

3,051,294
CATTLE FEED DISTRIBUTING APPARATUS
Theron John Reed, Burr Oak, Mich.
Filed May 21, 1959, Ser. No. 814,854
8 Claims. (Cl. 198—65)

This invention relates to improvements in cattle feed distributing apparatus. The principal objects of this invention are:

First, to provide apparatus for distributing cattle feed such as ensilage along an elongated feed platform or bunker and selectively discharging the feed to one side or the other of the bunker.

Second, to provide a feed distributor that is easily controlled from a central location to distribute feed longitudinally along either side or both sides of an elongated bunker or deliver feed at a single point at the end of the distributor or feed mixed ration without separation.

Third, to provide a feed distributor having the foregoing functional abilities which is simple in construction and relatively inexpensive yet sturdy and long lived.

Fourth, to provide a feed distributor in which the driving parts and controls can be located at a central protected position adjacent a supply point while the delivery portions of the distributor extends outwardly to a feed area and in which the exposed portions of the distributor are of simple sturdy construction well adapted to withstand exposure to the weather.

Other objects and adantages of the invention will be apparent from a consideration of the following description and claims. The drawings, of which there is one sheet, illustrate a highly practical form of the invention.

FIG. 1 is a fragmentary side elevational view of a length of the distributing apparatus of the invention with the driving and adjusting mechanism mounted thereon.

FIG. 2 is a fragmentary end elevational view of the delivery end of the mechanism appearing at the left end of FIG. 1.

FIG. 3 is a fragmentary top plan view of the drive and control mechanism of the distributor, the view being taken along the plane of the broken line 3—3 in FIG. 1.

In FIG. 1 the base line 1 indicates a feeding platform or support arranged at any suitable height and of any desired length to accommodate the number of animals to be fed. The distributor for delivering feed along this platform consists generally of a conveyor trough 2 vertically adjustably supported by an inner end support 3 and an outer end support 4. A conveyor screw 5 is rotatably mounted within the conveyor trough and delivery of the material being distributed is controlled by a valve element 6 mounted along the bottom of the conveyor trough as will be more particularly described presently. The trough 2, screw 5 and valve 6 are adapted at their left or outer end for connection to similar continuing sections as indicated by the dotted lines 2A and 6A so that the conveyor can be assembled in any length desired.

More specifically, the supports 3 and 4 which are identical consist of spaced parallel uprights 7 of oppositely inwardly facing channel shaped cross section. The uprights are connected at the top by a crossbar 8 and are provided with suitable supporting feet 9. Vertically slidably adjustable between the uprights 7 is a generally rectangular frame consisting of outwardly facing channel shaped side members 10 connected at the top by a crossbar 11 and connected at the bottom by a lower cross member 12 that is offset downwardly in the center. Vertical adjusting screws 13 passed through the upper cross member 8 and supported thereon by nuts 14 are connected to the frame cross member 11 for vertically adjusting the frame within the support side members 7.

The conveyor trough 2 consists of symmetrically opposite side members 15 having spaced parallel side walls 16 with inturned stiffening flanges 17 on their upper edges. The lower edges of the side walls are inclined downwardly inwardly in sloping bottom walls 18 that terminate in laterally spaced relation to the edges of their opposed parts and are turned outwardly in generally horizontal brace walls 19 connected to the side elements 10 by downturned flanges 20. The bottom walls 18 thus define an elongated narrow discharge mouth extending along the length of the conveyor chute 2.

The valve element 6 is of sector shaped cross section as appears in FIG. 2 and is supported by a longitudinally extending control shaft 21 that is supported near its ends at the center of the angled crosspiece 12. The upper curved sector 22 of the periphery of the valve is positioned to swing in closing relation across the discharge slot or to swing to either side thereof as indicated by the dotted lines at 6B in FIG. 2 in which position the flat side walls of the valve element will direct the discharge feed material selectively to either side of the conveyor trough.

The feed screw 5 is a helix mounted on a central shaft 23 and is supported in the feed trough by engagement of the helix with the inclined bottom walls 18. As previously indicated the conveyor chute is adapted to have extra sections attached thereto and for this purpose the ends of the delivery shaft 23 and control shaft 21 are reduced and shouldered as at 24 for pin connection to sockets on the ends of mating shafts and the ends of the side members 15 are outwardly offset as at 25 to nestingly receive and support the end of a similar conveyor trough section.

The right or inner end of the first trough section is closed by an end wall 26 having laterally turned flanges 27 secured to the side elements 10 of the adjusting frame and the end wall 26 supports a transmission case 28 having suitable speed reduction gearing 29 therein, connected to the drive shaft 23 of the conveyor screw and provided with a drive pulley 30. The pulley 30 is connected by the belt 31 to a drive pulley 32 on an electric motor 33 and the motor 33 is supported upon a suitable platform 34 connected to the adjusting frame side elements 10 to be vertically adjusted along with the conveyor trough and the screw 5.

Secured to the end of the platform 34 is a yoke 35 supporting a control crank 36 and connected worm 37 in driving engagement with a gear 38 connected to the end of the control shaft 21. Rotation of the crank 36 thus selectively rocks the control shaft 21 and the valve element 6. It will be obvious that when the valve element 6 is tilted to one side or the other material will be delivered to one side or the other of the conveyor trough completely therealong and that when the conveyor screw is actuated with the valve element 6 the material will be fed or delivered out of the open end of the trough 2. The feed distributing apparatus can be mounted with the motor 33 and control crank 36 within an enclosure such as a housing adjacent the bottom of a silo to protect the driving parts of the mechanism from the weather and to permit the regulated supply of the various feeds or feed mixtures to the conveyor. The outer exposed portions of the conveyor have no critical parts that are adversely affected by exposure to the weather and can be left out in the open. By inverting the valve 6 the V edge thereof will divide the material being delivered to both sides of the bunker.

What is claimed as new is:

1. Cattle feed distributing apparatus comprising a pair of end supports having spaced parallel uprights, frames vertically slidably guided between said uprights and having top cross members connecting spaced side elements, screw means connected between said supports and the top cross members of said frames to adjustably support said frames, laterally spaced side members carried by and extending between the side elements of said frames, said side members having spaced parallel side walls with inturned flanges on the top and downwardly and inwardly inclined bottom walls terminating in spaced relation with outwardly turned brace walls extending to the side elements of said frames and connected thereto by downturned vertical flanges, lower cross members on said frames rotatably supporting a control shaft longitudinally below the space between said bottom walls, an elongated valve element carried by said control shaft and having a sector shaped cross section with an arcuate periphery rotatable in closing relation between said bottom walls, a delivery shaft with a feed screw thereon extending longitudinally between said frames and between said side walls with the screw engaging said bottom walls, an end wall closing one end of the space between said bottom and side walls, a transmission supported on the outer side of said end wall and having a driven shaft connected to said delivery shaft, a motor support carried by the frame adjacent said end wall and having a motor drivingly connected to said transmission, a worm carried by said motor support and meshing with a gear connected to said control shaft, and crank means connected to said worm to adjust the position of said valve element relative to the opening between said bottom walls.

2. Cattle feed distributing apparatus comprising a pair of end supports having spaced parallel uprights, frames vertically slidably guided between said uprights and having top cross members connecting spaced side elements, means connected between said supports and said frames to adjustably support said frames, laterally spaced side members carried by and extending between said frames, said side members having spaced parallel side walls and downwardly and inwardly inclined bottom walls terminating in spaced relation with outwardly turned brace walls extending to said frames and connected thereto by downturned vertical flanges, lower cross members on said frames rotatably supporting a control shaft longitudinally below the space between said bottom walls, an elongated valve element carried by said control shaft and having a sector shaped cross section with a periphery rotatable in closing relation between said bottom walls, a delivery shaft with a feed screw thereon extending longitudinally between said frames and between said side walls with the screw engaging said bottom walls, an end wall closing one end of the space between said bottom and side walls, a transmission on the outer side of said end wall and having a driven shaft connected to said delivery shaft, a motor support carried by the frame adjacent said end wall and having a motor drivingly connected to said transmission, and means to adjust the position of said valve element relative to the opening between said bottom walls.

3. Cattle feed distributing apparatus comprising a pair of end supports having spaced parallel uprights, frames vertically slidably guided between said uprights and having top cross members connecting spaced side elements, means connected between said supports and said frames to adjustably support said frames, laterally spaced side members carried by and extending between said frames, said side members having spaced parallel side walls and downwardly and inwardly inclined bottom walls terminating in spaced relation, means on said frames rotatably supporting a control shaft longitudinally below the space between said bottom walls, an elongated valve element carried by said control shaft and having a periphery rotatable in closing relation between said bottom walls, a delivery shaft with a feed screw thereon extending longitudinally between said frames and between said side walls, an end wall closing one end of the space between said bottom and side walls, a transmission on the outer side of said end wall and having a driven shaft connected to said delivery shaft, a motor support carried by the frame adjacent said end wall and having a motor drivingly connected to said transmission, and means to adjust the position of said valve element relative to the opening between said bottom walls.

4. Cattle feed distributing apparatus comprising a pair of end supports having spaced parallel uprights, laterally spaced side members carried by and extending between said supports, said side members having spaced parallel side walls and downwardly and inwardly inclined bottom walls terminating in spaced relation with outwardly turned brace walls extending to said supports and connected thereto by downturned vertical flanges, lower cross members on said supports rotatably supporting a control shaft longitudinally below the space between said bottom walls, an elongated valve element carried by said control shaft and having a sector shaped cross section with a periphery rotatable in closing relation between said bottom walls, a delivery shaft with a feed screw thereon extending longitudinally between said side walls with the screw engaging said bottom walls, an end wall closing one end of the space between said bottom and side walls, a transmission on the outer side of said end wall having a driven shaft connected to said delivery shaft, a motor drivingly connected to said transmission, and means to rockably adjust the position of said valve element relative to the opening between said bottom walls.

5. Cattle feed distributing apparatus comprising a pair of end supports having spaced parallel uprights, laterally spaced side members carried by and extending between said supports, said side members having spaced side walls and downwardly and inwardly inclined bottom walls terminating in spaced relation with outwardly turned bracing walls extending to said supports, means on said supports rotatably supporting a control shaft longitudinally below the space between said bottom walls, an elongated valve element carried by said control shaft and having a sector shaped cross section with a periphery rotatable in closing relation between said bottom walls, a delivery shaft with a feed screw thereon extending longitudinally between said side walls, an end wall closing one end of the space between said bottom and side walls, a transmission on said end wall having a driven shaft connected to said delivery shaft, a motor drivingly connected to said transmission, and means to rockably adjust the position of said valve element relative to the opening between said bottom walls.

6. Cattle feed distributing apparatus comprising a trough made up of integral spaced side members having upright upper portions forming side walls of said trough and laterally inwardly and downwardly converging bottom portions forming spaced inclined bottom walls of said trough with a slot between the opposed edges thereof, means spaced along said trough and connecting said side members, a conveyor screw disposed in said trough and supported on said bottom walls with the sides of the screw in close but clearing relation to said side walls, an elongated valve of segmental cross section extending along the lower side of said slot, means rotatively adjustably supporting said valve from said side members along a longitudinal axis of the valve to selectively position the peripheral surface of the valve in closing relation to said slot or in slot opening position to either side of the slot, means for supporting said trough and valve above a collecting platform for material discharged through said slot, and means for rotatively driving said screw.

7. Cattle feed distributing apparatus comprising a trough made up of spaced side members having upright upper portions forming side walls of said trough and laterally inwardly and downwardly converging bottom portions forming spaced inclined bottom walls of said trough with a slot between the opposed edges thereof, means spaced along said trough and connecting said side members, a conveyor screw disposed in said trough and supported on said bottom walls, an elongated valve having a longitudinal surface at least as wide as said slot extending along the lower side of said slot with side surfaces extending sharply away from said longitudinal surface along each edge thereof, means rotatively adjustably supporting said valve from said side members along a longitudinal axis of the valve to selectively position said longitudinal surface of the valve in closing relation to said slot or in slot opening position to either side of the slot, means for supporting said trough and valve above a collecting platform for material discharged through said slot, and means for rotatively driving said screw.

8. Apparatus as defined in claim 6 in which said trough and said screw and said valve are made up of connectable sections.

References Cited in the file of this patent

UNITED STATES PATENTS

| 1,555,886 | Snyder | Oct. 6, 1925 |
| 2,646,023 | Virgil | July 21, 1953 |
| 2,738,766 | Hart | Mar. 20, 1956 |
| 2,803,334 | Kitson | Aug. 20, 1957 |

FOREIGN PATENTS

| 311,827 | Germany | May 2, 1919 |
| 704,254 | Great Britain | Feb. 17, 1954 |
| 733,871 | Great Britain | July 20, 1955 |